UNITED STATES PATENT OFFICE.

JOSEPH VAN RUYMBEKE, OF CHICAGO, ILLINOIS, ASSIGNOR TO THE NATIONAL CHEMICAL AND FERTILIZER COMPANY, OF SAME PLACE.

NITROGENOUS FERTILIZER.

SPECIFICATION forming part of Letters Patent No. 446,088, dated February 10, 1891.

Application filed October 17, 1890. Serial No. 368,374. (No specimens.)

*To all whom it may concern:*

Be it known that I, JOSEPH VAN RUYMBEKE, a subject of the King of Belgium, and residing at Chicago, in the county of Cook and State of Illinois, have invented certain new and useful Improvements in Fertilizing Material, which are fully set forth in the following specification.

My invention relates to a certain compound obtained by the treatment of "stick" in a certain manner, whereby a nitrogenous material is obtained suitable for use in the manufacture of fertilizers.

The object of the present invention is to utilize the sulphate or persulphate of iron or other soluble salts of iron or a soluble salt of alumina for the purpose of curing what is generally known as "stick," which is obtained by the concentration of tank-water.

In my patent, No. 367,732, dated August 2, 1887, I have set out the use of the soluble salts of iron and alumina in the treatment of concentrated tank-water. I have discovered, however, that if a certain proportion of lime is added to a soluble salt of iron or alumina—such, for instance, as the persulphate—making it therefore still more basic, and even perhaps producing a small percentage of insoluble basic salt, the action on the stick of the mixture thus obtained is more thorough than with the soluble salt before it is made basic. The active agents in curing the stick are the chemicals specified in my said prior patent; but these salts of iron or alumina, which are the active agents, are rendered more effective by making them more basic. At the same time the salts should retain their solubility if the salt is to be utilized for curing stick. This result may be obtained by a final calcination—such, for instance, as described in my application No. 356,139—and then adding thereto an alkali—such, for example, as slaked lime.

In carrying out my invention in the preparation of this product I add to such quantity as may be conveniently used of the sulphate or persulphate of iron or other soluble salt of iron or alumina about ten per centum, in weight, of dry slaked lime—that is to say, to one hundred pounds of the salt about ten pounds of the slaked lime should be added. Water is added to this mixture in the proportion of eight to ten gallons of water to about one hundred and sixty pounds of the material, the mass being then mixed and allowed to soak for several hours. It is then heated to the boiling-point and allowed to boil a few minutes. This liquid is applied to the stick either cold or hot, but preferably hot, as its action is more efficient in this condition and is the best when at about the boiling-point. The proportions of the liquid thus obtained and the stick (to properly cure the latter) will depend of course largely upon the amount of water in the stick. If the stick is evaporated to about thirty per centum, the quantity obtained by mixing one hundred and sixty pounds of the dry salt and lime with from eight to ten gallons of water will cure about twelve hundred and fifty pounds of stick and produce about one thousand pounds of fertilizing material when dried. The liquid is applied to the stick by stirring it therewith in any suitable vessel and by any suitable means until the substances are thoroughly mixed together. The result will be a stiff putty-like substance, which is then placed in suitable pans and dried in any suitable oven; or it may be dried in any other way which will drive off the remaining moisture. The final result, after drying, is a dry product, which may be ground or otherwise pulverized and will retain its dry granulated condition. This product is a valuable nitrogenous fertilizing material containing quite a large per centum of equivalent ammonia, suitable for the market and ready for use in the manufacture of fertilizers. A larger proportion of the lime may be used than mentioned above, in which case, however, some insoluble compounds of iron or alumina will be produced; but these insoluble compounds will be practically inactive in curing stick, so that the excess of lime will really result in reducing the efficient action of the compound, taking it pound for pound of the salt.

Having thus described my invention, what I claim as new, and desire to secure by Letters Patent, is—

A fertilizing material consisting of stick and a soluble salt of iron or alumina made basic by the addition of lime thereto, substantially as and for the purpose set forth.

JOSEPH VAN RUYMBEKE.

Witnesses:
CARRIE FEIGEL,
A. M. BEST.